UNITED STATES PATENT OFFICE.

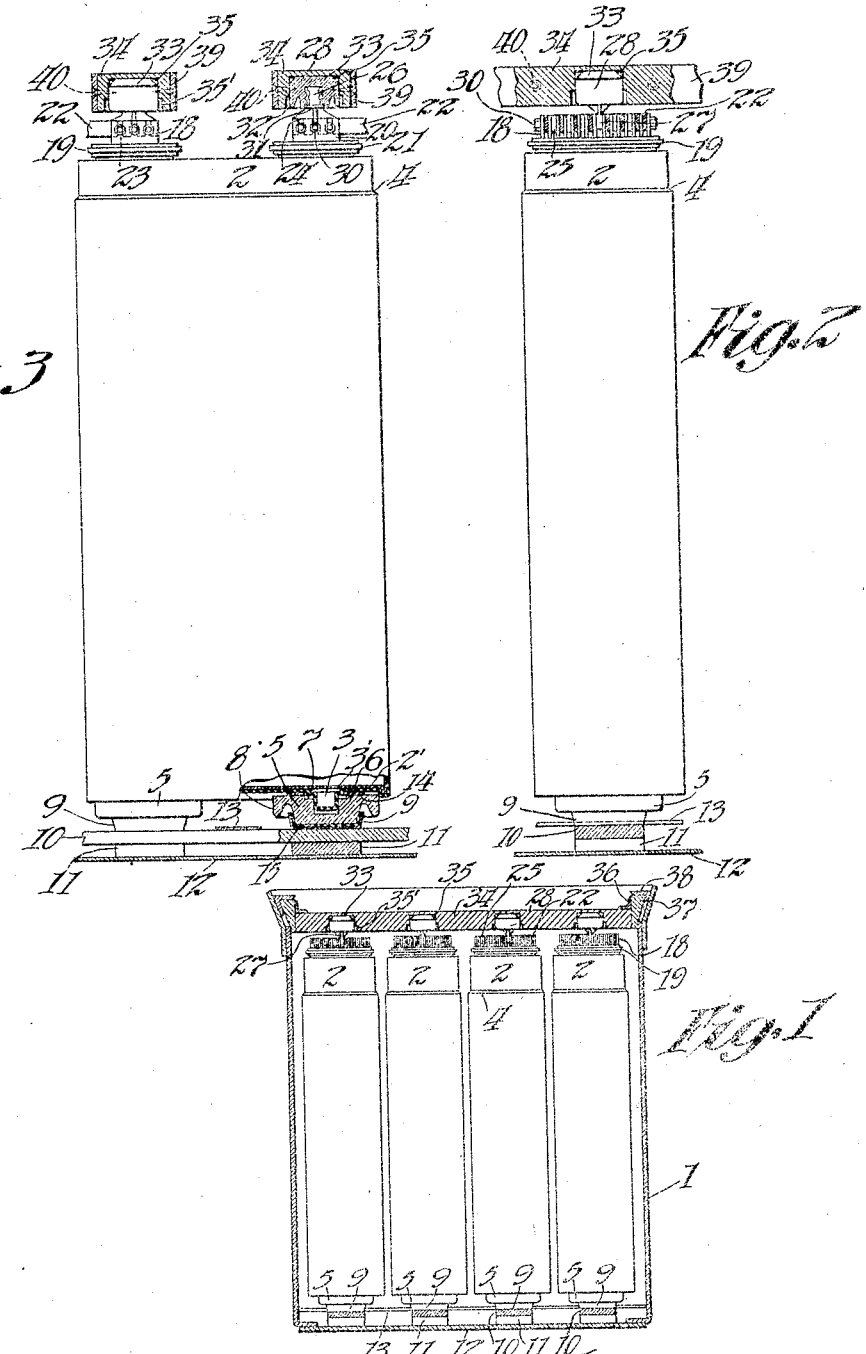

MILLER REESE HUTCHISON AND CHARLES W. NORTON, OF WEST ORANGE, NEW JERSEY, ASSIGNORS TO EDISON STORAGE BATTERY COMPANY, OF WEST ORANGE, NEW JERSEY, A CORPORATION OF NEW JERSEY.

BATTERY-SUPPORTING DEVICE.

1,313,384.      Specification of Letters Patent.      Patented Aug. 19, 1919.

Application filed January 20, 1917. Serial No. 143,493.

*To all whom it may concern:*

Be it known that we, MILLER REESE HUTCHISON, a citizen of the United States, and a resident of Llewellyn Park, West Orange, Essex county, New Jersey, and CHARLES W. NORTON, a citizen of the United States, and a resident of West Orange, Essex county, New Jersey, have invented certain new and useful Improvements in Battery-Supporting Devices, of which the following is a description.

Our invention relates to battery supporting devices and more particularly to an improved construction and arrangement for rigidly supporting and securely holding together in proper relative position, a group of battery cells in a compartment therefor, such for example, as the battery tank of a submarine boat; and also to the combination of such a device and any number of battery cells supported thereby. While our improved supporting device is designed particularly for use with battery cells of great size and considerable weight, such as storage battery cells of the Edison type designed for submarine service, wherein an alkaline electrolyte is employed and the electrolyte and battery elements are contained in a large metallic receptacle or containing can, it is to be understood that the same may be effectively utilized with other types of battery cells.

One of the objects of our invention is to provide such a device which is of great strength and durability and capable of withstanding great shocks and strains. A further object of our invention is to provide an improved construction whereby the cells are rigidly held in the supporting device, regardless of the position of the latter, against all movement with respect thereto and with respect to each other, and whereby the individual cells are spaced and insulated from and kept out of contact with the body of the supporting device and each other, and are guarded from contact with other conducting bodies.

Our invention also consists in a supporting device of simple and improved construction wherein any desired number of battery cells may be easily and quickly assembled with adequate spaces for ventilation and cooling provided on all sides of the cells, and whereby short-circuiting of any of the cells by moisture or other matter, which may be present from any cause, is effectively prevented.

Other objects and features of our invention will be hereinafter more fully described and claimed.

For a clearer understanding of our invention, attention is directed to the drawing accompanying and forming a part of this specification, in which:

Figure 1 is a transverse cross-sectional view, partly in elevation, of a supporting device in accordance with our invention, and a plurality of Edison storage battery cells of the submarine type supported thereby;

Fig. 2 is an enlarged view, similar to Fig. 1, showing a single cell and the parts of the supporting device which coöperate therewith; and Fig. 3 is an enlarged view partly in elevation and partly in section, taken at right angles to the view shown in Fig. 2, and showing a single cell and the parts of the supporting device which coöperate therewith.

Referring to the drawing, reference character 1 represents a battery compartment, preferably the battery tank of a submarine boat, and reference characters 2, 2, 2, 2, Fig. 1, represent the cells in one of a plurality of rows of battery cells extending transversely or athwartship of such compartment or tank 1, and also respectively represent cells in four rows of cells extending lengthwise or fore and aft of said compartment or tank 1. Cells 2 are shown as Edison storage battery cells of the submarine type, such as disclosed in the pending application of Charles W. Norton S. N. 121,939 filed September 25, 1916, and entitled Galvanic batteries; and each of said cells has a pair of flanged projections 3, spaced in the direction of the length of the cell, suitably secured to the bottom 2' of its steel container. The bottom 2' of each cell container is provided with a peripheral flange welded to the side walls of the container whereby a depending petticoat is formed about said bottom. The projections 3 are preferably secured to the steel cell containers by welding the flanged portions 3' thereof to the bottoms 2' of these containers. The bottom of each of the cell containers, including the projections 3, and the vertical walls thereof, except for a small distance at the upper end portion of the container, are entirely covered with a coating 4 of semi-hard rubber permanently vulcanized to the steel surface, so as to better insulate the individual cells from each other and from other bodies and materials. Each of the cells 2 is firmly supported and insulated at its bottom by a pair of insulators 5, preferably of porcelain, which engage the bottom of the cell container and are provided with recesses 6 articulating with the projections 3, the recesses 6 being provided with enlargements 7 at their outer ends for accommodating the flanged portions 3' of the projections 3. Each insulator 5 is provided at the outer edge of its upper end portion with a depending petticoat 8 to shed moisture. Perforated disks 14 of semi-hard rubber and of substantially the same diameter as the body portions of insulators 5 are respectively disposed between such insulators and the bottoms of containers 2, so that none of the weight of the cells will be imposed on the overhanging petticoats 8 of such insulators. Consequently the liability of the petticoats 8 becoming broken is practically eliminated. The bottom portions of insulators 5 respectively articulate with or rest in metallic cup-shaped pieces or members 9 which are suitably secured in proper spaced relation, to wooden strips 10 running lengthwise or fore and aft of the battery tank 1 and engaging the ends of the latter. The strips 10 are suitably secured to wooden blocks or pieces 11 which rest upon the bottom 12 of the battery tank or compartment 1. The pieces or strips 10 are firmly maintained in proper spaced relation by transversely or athwartship extending steel strips or pieces 13, suitably secured to the upper sides thereof, the ends of these strips 13 engaging the side walls of the compartment or tank 1. A pad or cushion 15, preferably formed of semi-hard rubber, is preferably disposed between each of the insulators 5 and the steel cup-shaped piece 9.

It will be obvious that by means of the grille work consisting of the strips or pieces 10 and 13, and the devices coöperating with such grille work, and the cells, the latter are firmly held at their lower end, in proper spaced relation to each other and to the battery tank 1, and are also excellently insulated from the tank and from each other.

The upper end portions 18 of the plates or elements of one polarity in each cell, extend through and project above a suitable stuffing box 19 secured in the top of the cell container adjacent one end of the latter, while the upper end portions 20 of the plates or elements of the opposite polarity in each cell extend through and project above another stuffing box 21 in the top of the cell container adjacent the opposite end of the latter, the lugs or portions of the respective groups of lugs or portions 18 and 20 of each cell, being substantially equispaced and constituting the poles of such cell. The cells of each of the rows of cells extending longitudinally or fore and aft of the battery compartment or tank 1 are electrically connected and mechanically spaced by heavy nickel plated copper conducting bars or strips 22 which are inserted between the lugs or portions 18 of one cell and the lugs or portions 20 of the adjacent cell and which are suitably secured to such lugs or portions as by bolts 30. The bars or connectors 22 are slotted on the lower side, as indicated at 23, and the pieces or lugs 18 and 20 are slotted at their upper ends, as indicated at 24, to permit the bolts 30 to be readily applied to the poles and to permit the connector bars 22 to be readily applied to and removed from the poles. It is not necessary in order to properly electrically connect the cells, that every strip or bar between the lugs or portions 18 and 20 should extend between cells, and accordingly certain of the spaces between the adjacent lugs 18 and 20 are filled with short bars or strips 25 of a length equal to the width of the lugs 18 and 20. The short strips 25 are provided with slots in their lower portions similar to the slots 23 in the bars or strips 22.

A pin 26, preferably formed of nickel plated malleable iron, is secured to each pole of each cell by the lower flat rectangular portion 27 thereof, which is preferably formed integrally therewith and which is inserted in the space between a pair of adjacent lugs or portions 18 or 20 of each cell, in place of one of the short bars or strips 25. The said flat portion 27 of each pin 26 is provided with slots in its lower side similar to the slots 23 in the bars or strips 22, for the reception of the bolts 30. The pins 26 are respectively suitably secured to insulating members 28, preferably formed of porcelain, by cementing the same in centrally disposed openings or recesses formed in the lower portion of such members, these recesses being preferably provided with enlargements at their lower ends to provide seats for collars 31, preferably formed integrally with the pins 26 between the pins proper and the flat portions 27 thereof. The insulating members 28 are each provided with a depending petticoat 32 and with a beveled upper end portion 33. The bevel of portions 33 is such that the upper ends of members 28 will be substantially of the same diameter as the body portions of these members. Consequently the petticoats 32 of members 28 will be relieved of substantially all strains imposed on the latter by members 34 hereafter described. The groups of insulating members 28 and the pins 26 attached to the respective rows of poles extending transversely or athwartship of the battery compartment or tank 1, are respectively securely connected to members or bars 34, preferably formed of wood, which extend transversely or athwartship of said compartment or tank, by the engagement of said members 28 in openings or recesses 35 provided therefor in said wooden members. The recesses 35 are preferably of such size that insulating members 28 are respectively in close engagement with the upper portions of the sides and the bottoms thereof. The lower end portions of recesses 35 are enlarged as shown at 35' to provide a space about the petticoats 32 of members 28 in order that members 34 will not interfere with the shedding of moisture by said petticoats. The ends of the transversely extending bars or members 34 are firmly secured in any suitable manner to the upper side portions of the compartment or tank 1, but preferably by means consisting of longitudinally or fore and aft extending angle beams 36 suitably secured to the ends of bars 34 and to longitudinally extending wooden members 37, and longitudinally extending angle beams 38, which, in turn, are suitably secured to members 37 and the upper portions of the side walls of the compartment or tank 1. Each of the bars 34 is preferably reinforced as by means of metal bars 39 secured to the sides thereof by screws 40.

The insulating members 28 described and shown herein, form the subject matter of a divisional application Serial No. 308,471 filed July 3, 1919 and entitled Insulators.

By the construction described herein the cells are securely held both at the top and bottom against movement relative to the tank or to each other, regardless of the amount the said battery compartment or tank may be tipped from the vertical. Moreover the proper spacing between the cells themselves and between the cells and the walls of the battery compartment or tank is permanently maintained, to thereby provide for effective ventilation and cooling of the entire group of cells in the battery compartment or tank. Each of the cells is also excellently insulated at all points from the battery compartment or tank and from the other cells, due to the provision of the rubber coating 4, the petticoat insulators 5 and 28, and the petticoat at the bottom of the cell produced by welding the side walls of the latter to the flange of the bottom 2'. These petticoats effectively shed moisture and prevent the latter from creeping and bridging conductive parts separated thereby. The insulating devices described herein are found to be so effective that the insulation of the cells from each other and from the battery compartment or tank is maintained even though the tank and cells are subjected to a shower of current conducting liquid.

While we have described the preferred embodiment of our invention it is to be understood that many changes may be made in the size, form and arrangement of the parts thereof without departing from the spirit of the invention and the scope of the appended claims.

Having now described our invention, what we claim and desire to protect by Letters Patent is as follows:—

1. The combination with a battery compartment and a plurality of battery cells disposed therein, of means for preventing relative movement of said cells in said compartment comprising a device fitting closely within said compartment adjacent the bottom thereof and having articulated connection with said cells, substantially as described.

2. The combination with a battery compartment and a plurality of battery cells disposed therein, of means for preventing relative movement of said cells and compartment comprising a frame consisting of members rigidly secured together and extending longitudinally and transversely of said compartment, said frame fitting closely within said compartment adjacent the bottom thereof and having articulated connection with said cells, substantially as described.

3. The combination with a battery compartment and a plurality of battery cells disposed therein, of means for preventing relative movement of said cells in said compartment comprising a device fitting closely within said compartment adjacent the bottom thereof and having articulated connection with said cells, and members extending across the compartment adjacent the top thereof and having articulated connection with the tops of said cells, substantially as described.

4. The combination with a battery compartment and a plurality of battery cells disposed therein, of means for preventing relative movement of said cells and compartment comprising a frame consisting of members rigidly secured together and extending longitudinally and transversely of said compartment, said frame fitting closely within said compartment adjacent the bottom thereof and having articulated connection with said cells, and members extending across the compartment adjacent the top thereof and having articulated connection with the tops of said cells, substantially as described.

5. The combination with a battery compartment and a battery cell disposed therein, of means for preventing relative movement of said cell and compartment comprising a member extending across and secured to walls of said compartment adjacent the top thereof, said member having articulated connection with the top of said cell, substantially as described.

6. The combination with a battery compartment and a battery cell disposed therein, of means for preventing relative movement of said cell and compartment comprising a member extending across and secured to walls of said compartment adjacent the top thereof, said member having articulated connection with the top of said cell, said connection comprising a petticoat insulating member, substantially as described.

7. The combination with a battery compartment and a battery cell disposed therein, of means for preventing relative movement of said cell and compartment comprising a member extending across and secured to walls of said compartment adjacent the top thereof, said member having articulated connection with the pole of such cell, said connection comprising a petticoat insulating member secured to said pole and closely engaging an opening provided therefor in said member, substantially as described.

8. The combination with a battery compartment and a battery cell disposed therein, of means for preventing relative movement of said cell and compartment comprising a pair of members extending across and secured to walls of said compartment adjacent the top thereof, said members respectively having articulated connections with the poles of such cell, substantially as described.

9. The combination with a battery compartment and a plurality of battery cells disposed therein, of means for preventing relative movement of said cells in said compartment comprising a device fitting closely within said compartment adjacent the bottom thereof and having articulated connection with said cells, and members extending across the compartment adjacent the top thereof and having articulated connection with the tops of said cells, each of said connections comprising a petticoat insulating member, substantially as described.

10. The combination with a battery compartment and a battery cell disposed therein, of means for preventing all movement of said cell relative to said compartment comprising a pair of devices extending transversely of and held against movement relative to said compartment, said devices respectively having articulated connection with the top and bottom of said cell, substantially as described.

11. The combination with a battery compartment and a battery cell disposed therein, of means for preventing all movement of said cell relative to said compartment comprising a pair of devices extending transversely of and held against movement relative to said compartment, said devices respectively having articulated connection with the top and bottom of said cell, each of said connections comprising a petticoat member, substantially as described.

12. The combination with a battery cell having a plurality of pole pieces projecting from the top thereof, of means for holding said cell in position within a container or compartment therefor comprising a petticoat insulating member and a member having its lower end secured between two such adjacent pole pieces and its upper end secured to said insulating member, substantially as described.

13. The combination with a battery compartment and a battery cell disposed therein, of means for preventing all movement of the said cell relative to said compartment and having articulated connections with the top and bottom of said cell, each of said connections comprising a petticoat insulating member, substantially as described.

14. The combination with a battery compartment and a battery cell disposed therein, of means for supporting said cell within and spaced from the walls of said compartment comprising a cup-shaped member, means for holding said cup-shaped member against movement relative to said compartment, and an insulating member having articulated connection with said cell and seated in said cup-shaped member, substantially as described.

15. The combination with a battery compartment and a battery cell disposed therein, of means for supporting said cell within and spaced from the walls of said compartment comprising a cup-shaped member, means for holding said cup-shaped member against movement relative to said compartment, an insulating member connected with said cell and seated in said cup-shaped member, and a cushion between said insulating member and said cup-shaped member, substantially as described.

16. The combination with a battery compartment and a plurality of battery cells disposed therein, of means for preventing relative movement of said cells and compartment comprising a frame consisting of members rigidly secured together and extending longitudinally and transversely of said compartment, said frame fitting closely within said compartment adjacent the bottom thereof and having articulated connection with said cells, and means for supporting said frame from the bottom of said compartment in spaced relation thereto comprising a plurality of blocks or members mounted on the bottom of the compartment, substantially as described.

17. The combination of a battery compartment, a plurality of battery cells disposed therein and provided with bottom projections, insulating cushioning material covering said projections, and means for rigidly supporting said cells in said compartment spaced and insulated from said compartment and from each other comprising a device disposed and closely fitting in the compartment adjacent the bottom thereof, and members mounted on said device and respectively having articulated connection with said projections, substantially as described.

18. The combination with a battery compartment and a plurality of battery cells disposed therein, of means for rigidly supporting said cells in said compartment spaced and insulated from the compartment and from each other comprising a frame closely fitting in said compartment adjacent the bottom thereof, a plurality of members mounted on the bottom of the compartment and supporting said frame in spaced relation thereto, members secured to said frame and having articulated connections with the bottoms of said cells, and a plurality of elements having articulated connections with the tops of said cells, said elements extending across the battery compartment adjacent the top thereof and being held against movement relative to the compartment, each of said articulated connections comprising a petticoat insulating device, substantially as described.

19. The combination with a battery cell, of means for supporting the same comprising an insulating member having a peripheral petticoat portion and a flat member not substantially greater in diameter than the body portion of the insulating member disposed concentrically with respect to the latter between the same and the bottom of the cell container, substantially as described.

20. In a battery supporting device, a member provided with an open-ended recess, and an insulating member having a peripheral petticoat adjacent one end thereof and so disposed in said recess that said petticoat is adjacent the open end of the latter, the portion of said recess adjacent its open end being enlarged to provide a space about said petticoat, substantially as described.

21. The combination with a battery compartment and a plurality of battery cells disposed therein, of means for preventing relative movement of said cells in said compartment, comprising a device fitting closely within said compartment adjacent the bottom thereof and connected with said cells, substantially as described.

This specification signed this 19th day of January, 1917.

MILLER REESE HUTCHISON.
CHARLES W. NORTON.